United States Patent [19]
Allen et al.

[11] 3,964,241
[45] June 22, 1976

[54] EYE PROTECTIVE DEVICE

[76] Inventors: Elaine Allen; Eileen Schrier, both of 9223 Overland Road, Boise, Idaho 83705

[22] Filed: July 29, 1974

[21] Appl. No.: 492,746

[52] U.S. Cl. ................................................ 54/80
[51] Int. Cl.² ........................................ B68C 5/00
[58] Field of Search .................. 54/80, 81; 119/142, 119/143; 2/14 R, 14 G, 14 H, 14 L

[56] References Cited
UNITED STATES PATENTS

| | | | |
|---|---|---|---|
| 121,528 | 12/1871 | Low | 54/80 |
| 287,885 | 11/1883 | Sumner | 54/80 |
| 327,762 | 10/1885 | Brick | 54/80 |
| 481,152 | 8/1892 | Steele | 54/80 |
| 3,104,508 | 9/1963 | O'Hare, Jr. | 54/81 |
| 3,753,334 | 8/1973 | Blessing | 54/80 |

FOREIGN PATENTS OR APPLICATIONS

| | | | |
|---|---|---|---|
| 729,587 | 12/1942 | Germany | 54/80 |

*Primary Examiner*—Louis G. Mancene
*Assistant Examiner*—Jack Q. Lever
*Attorney, Agent, or Firm*—Strauch, Nolan, Neale, Nies & Kurz

[57] ABSTRACT

An eye protective device for large animals such as horses wherein a flexible frame defining individual eye surrounding loops is secured on the animal's head and each loop mounts an outwardly bulging mesh panel that does not interfere with the animal's vision but bars passage of insects.

3 Claims, 6 Drawing Figures

EYE PROTECTIVE DEVICE

This invention relates to a protective device for shielding the eyes of a horse or other large animal against attack by insects, flies and the like while at the same time not interfering with the animal's vision or effecting undue restraint.

More specifically the invention has as its major object to provide a novel unitary eye protection device that may be easily placed in conforming contour on the head of the animal and secured in place with a single tying operation.

It has been proposed as in U.S. Pat. No. 3,753,334 to provide protective bonnets for the heads of horses and like large animals. The present invention provides a protective device of this general type which is particularly arranged to form indivdual insect proof seals around each of the eyes and improved retention on the head of the animal, as well as being of ample inexpensive construction.

PREFERRED EMBODIMENTS

Figure 1:
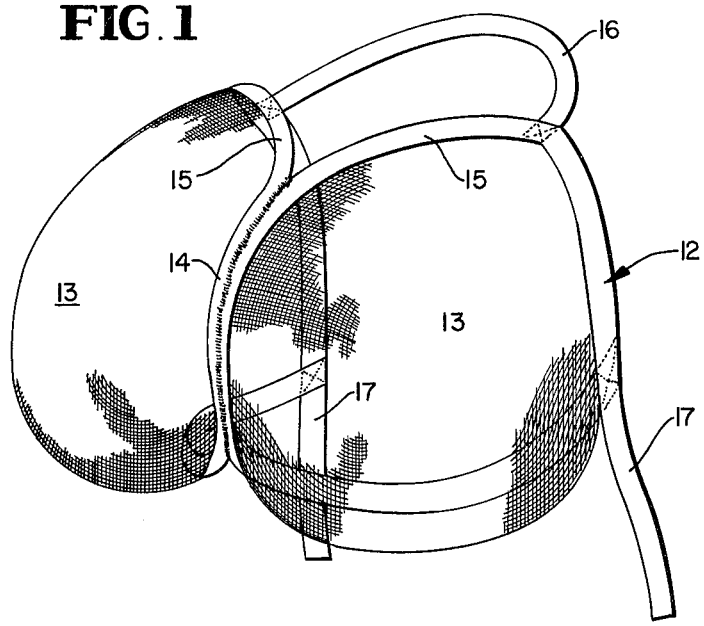
FIG. 1 is a generally perspective view showing the eye protective device of the invention according to a preferred embodiment.

As shown in the drawings the eye protective device comprises essentially a flexible frame 12 mounting indivdual loose outwardly bulging effectively hemispherical transparent mesh panels 13 over each eye of the horse.

Figure 2:
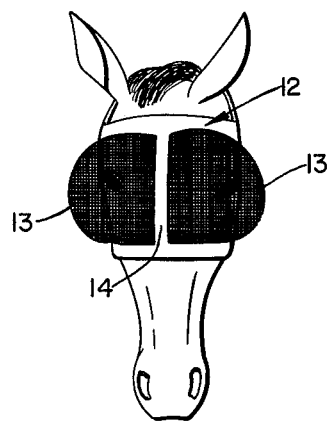
FIG. 2 is a front view showing the device in place on a horse's head.
Figure 3:
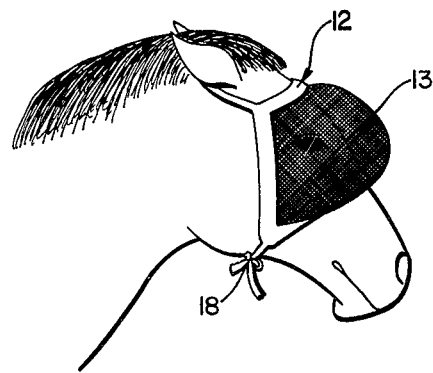
FIG. 3 is a side elevation.
Figure 4:
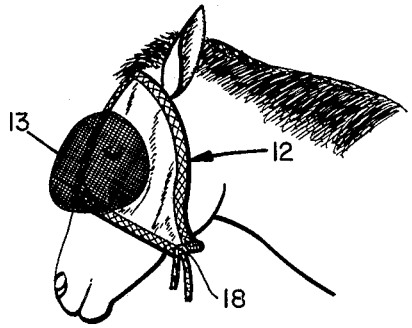
FIG. 4 is an opposite side elevation.
Figure 5:
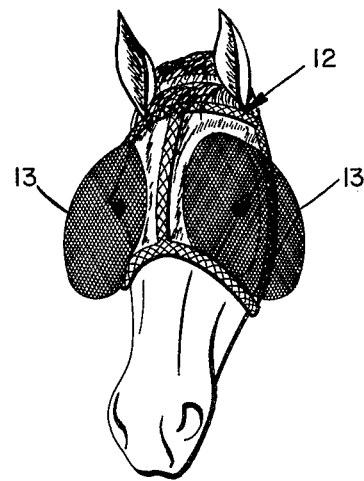
FIG. 5 is a generally perspective front view of the horse's head with the device in place.

Frame 12 comprises a central tape-like strip of fabric 14 that (FIG. 2) extends down the front of the head in the space between the eyes substantially normal to a generally horizontal line extending between the eyes. Continuous loops 15 extend laterally outwardly from the central strip 14 and they are relatively large so that they may engage the head well above, well below and well laterally outwardly of the eyes. The loops 15 are preferably of the same size and may be of a waterproof fabric like strip 14.

In a preferred structure the loops 15 are of the same size and shape and they are attached as by sewing them together along adjacent inner sides, the sewed together regions forming central strip 14. This is advantageous construction in that it permits the manufacture of single size loop units which may be used for either eye and sewed together to provide the assembly.

Above the eyes a flexible, preferably elastic, strap 16 extends from the upper end of one loop 15 to the upper end of the other. This strap is intended to pass around behind the ears of the horse to aid in retaining the device on the head, and its elasticity enables it to conform to different head sizes and shapes as well as to retain the device in place.

Below the eyes, tie straps 17 are secured at one end to the respective loops, and these tie straps are intended to pass under the lower side of animal's head but above the mouth and be secured together as in the knot 18.

In practice it has been found that each side of frame 12, except for elastic strap 16, may be made from a single length strip of fabric having tie strap 17 portion at one end as shown in FIG. 1 with the remainder of the strip forming the loop 15 and sewn at its other end to the upper end of the tie strap portion. Thus identical halves of the frame 12 may be sewn formed in one sewing operation and then sewn together in another operation at 14 to complete the frame assembly.

A panel 13 of flexible mesh material is secured about its perimeter, as by sewing, to each loop. The area of each mesh panel is much greater than the area enclosed by its frame loop, so that in the assembly as shown the panel 13 assumes a rather random outwardly bulging shape wherein there is no danger of it contacting the animal's eyes or physically or optically interfering with effective vision. It has been found that a mesh material of synthetic fabric like nylon having an inherent stiffness sufficient to generally retain an outwardly bulged shape is preferable. The mesh material should be non-absorbent with respect to water so as not to collapse in rain or snow.

Figure 6:
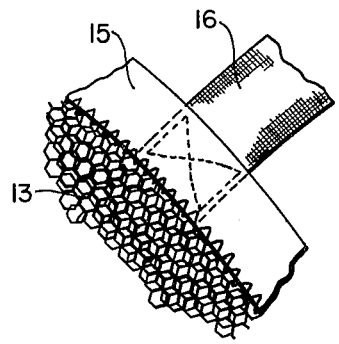
FIG. 6 is an enlarged fragmentary view showing the construction and the dual mesh layers.

The mesh of panels 13 must be small enough to prevent the passage of flies and damaging insects, and preferably each panel is composed of two similar coextensive sheets of the mesh material secured together around their perimeters around the loop as shown in FIG. 6 but capable of relative movement between their perimeters. This is advantageous in that it effectively provides randomly changing size through openings in each panel and thereby more effectively bars passage of insects.

The invention thus provides a readily installed protective device which when mounted on the head of the animal provides individual insect-sealed protective for each eye due to the fact that the flexible frame loop portion conforms to the head contours. No buckles or like fasteners are needed because when the tie straps are drawn together the frame is conformed to the head.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A device for the protection of the eyes of a large animal such as a horse or cattle without material restraint or obstruction of vision comprising a flexible frame having a central relatively narrow portion adapted to overlie the head of the animal and extend along the surface of the front of the head between the eyes substantially midway normal to a line connecting the eyes and loops extending laterally outwardly from said central portion each adapted to engage the head of the animal above, below and laterally outwardly of the eyes, said loops being continuous and said central portion serving as a common side of each loop, upper and lower straps connecting the loops, the upper strap being adapted to pass over the animal's head behind the ears or poll and the lower strap being adapted to pass around the underside of the head below the level of the eyes, at least one of said straps being of the adjustable multipart type, and means providing a vision permitting panel of mesh material on each loop, said panels each being fixed at their perimeters to its loop and each of said panels being of considerably larger area than the space enclosed by its loop and each panel being formed of a material that is flexible but sufficiently stiff to provide an outwardly bulged retained shape whereby when the device is installed on an animal the frame will be drawn into snug conformance with the animal's head by said straps so that insects and the like cannot penetrate to the head regions at and around the eyes while the panels bulge in substantially self supporting fashion outwardly from the loops so as not to interfere with normal eye movements, each side of said frame surrounding an eye of the animal comprising a single length of fabric formed into said loop with one end extending beyond the loop to provide part of said adjustable strap, and adjacent sides of said loops being secured together to provide said central portion, with said loops and central portion forming individual insect-sealed regions around the respective eyes.

2. The device defined in claim 1, wherein each panel consists of a plurality of coextensive sheets of flexible mesh material secured together at their perimeters around each loop.

3. The device defined in claim 1, wherein said upper strap is elastic and said lower strap comprises separate tie strap portions are secured to the lower side of each loop, said tie straps being adapted to be secured together at the underside of the head to draw the frame into conformity with the head.

* * * * *